(12) United States Patent
Gangwar et al.

(10) Patent No.: US 10,324,509 B2
(45) Date of Patent: *Jun. 18, 2019

(54) AUTOMATIC GENERATION OF POWER MANAGEMENT SEQUENCE IN A SOC OR NOC

(71) Applicant: NetSpeed Systems, San Jose, CA (US)

(72) Inventors: Anup Gangwar, Bangalore (IN); Vishnu Mohan Pusuluri, Bangalore (IN); Poonacha Kongetira, Saratoga, CA (US); Sailesh Kumar, San Jose, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/903,702

(22) Filed: Feb. 23, 2018

(65) Prior Publication Data

US 2018/0181174 A1    Jun. 28, 2018

Related U.S. Application Data

(63) Continuation of application No. 14/498,907, filed on Sep. 26, 2014, now Pat. No. 10,042,404.

(51) Int. Cl.
*G06F 17/50* (2006.01)
*G06F 1/26* (2006.01)
(Continued)

(52) U.S. Cl.
CPC ............ *G06F 1/26* (2013.01); *G06F 1/324* (2013.01); *G06F 1/3287* (2013.01); *G06F 1/3296* (2013.01); *Y02D 10/126* (2018.01); *Y02D 10/171* (2018.01); *Y02D 10/172* (2018.01); *Y02D 50/20* (2018.01)

(58) Field of Classification Search
USPC ..................................................... 716/138
See application file for complete search history.

(56) References Cited

U.S. PATENT DOCUMENTS 5,432,785 A   7/1995   Ahmed et al.
5,764,741 A   6/1998   Holender
(Continued)

FOREIGN PATENT DOCUMENTS

CN     103684961 A    3/2014
WO     2014059024 A1  4/2014

OTHER PUBLICATIONS

Abts, D., et al., Age-Based Packet Arbitration in Large-Radix k-ary n-cubes, Supercomputing 2007 (SC07), Nov. 10-16, 2007, 11 pgs.
(Continued)

*Primary Examiner* — Eric D Lee
(74) *Attorney, Agent, or Firm* — Spectrum IP Law Group LLC

(57) ABSTRACT

Systems and methods of the present disclosure relate to automatically and/or dynamically generating one or more power management sequences for SoC and NoC architectures from a given input specification having one or a combination of NoC design specification, traffic specification, traffic profile, power profile information, initiator-consumer relationship, interdependency between components, retention information, external factors, among other allied configurations/information to enable efficient switching of one or more hardware elements from one power profile to another.

9 Claims, 13 Drawing Sheets

(51) Int. Cl.
*G06F 1/324* (2019.01)
*G06F 1/3287* (2019.01)
*G06F 1/3296* (2019.01)

(56) References Cited

U.S. PATENT DOCUMENTS

| | | | |
|---|---|---|---|
| 5,991,308 | A | 11/1999 | Fuhrmann et al. |
| 6,003,029 | A | 12/1999 | Agrawal et al. |
| 6,249,902 | B1 | 6/2001 | Igusa et al. |
| 6,415,282 | B1 | 7/2002 | Mukherjea et al. |
| 6,925,627 | B1 | 8/2005 | Longway et al. |
| 7,065,730 | B2 | 6/2006 | Alpert et al. |
| 7,318,214 | B1 | 1/2008 | Prasad et al. |
| 7,590,959 | B2 | 9/2009 | Tanaka |
| 7,725,859 | B1 | 5/2010 | Lenahan et al. |
| 7,808,968 | B1 | 10/2010 | Kalmanek, Jr. et al. |
| 7,917,885 | B2 | 3/2011 | Becker |
| 8,050,256 | B1 | 11/2011 | Bao et al. |
| 8,059,551 | B2 | 11/2011 | Milliken |
| 8,099,757 | B2 | 1/2012 | Riedle et al. |
| 8,136,071 | B2 | 3/2012 | Solomon |
| 8,281,297 | B2 | 10/2012 | Dasu et al. |
| 8,312,402 | B1 | 11/2012 | Okhmatovski et al. |
| 8,448,102 | B2 | 5/2013 | Komachuk et al. |
| 8,492,886 | B2 | 7/2013 | Or-Bach et al. |
| 8,541,819 | B1 | 9/2013 | Or-Bach et al. |
| 8,543,964 | B2 | 9/2013 | Ge et al. |
| 8,601,423 | B1 | 12/2013 | Philip et al. |
| 8,635,577 | B2 | 1/2014 | Kazda et al. |
| 8,667,439 | B1 | 3/2014 | Kumar et al. |
| 8,717,875 | B2 | 5/2014 | Bejerano et al. |
| 2002/0071392 | A1 | 6/2002 | Grover et al. |
| 2002/0073380 | A1 | 6/2002 | Cooke et al. |
| 2002/0095430 | A1 | 7/2002 | Egilsson et al. |
| 2004/0216072 | A1 | 10/2004 | Alpert et al. |
| 2005/0147081 | A1 | 7/2005 | Acharya et al. |
| 2006/0161875 | A1 | 7/2006 | Rhee |
| 2006/0268909 | A1 | 11/2006 | Langevin et al. |
| 2007/0088537 | A1 | 4/2007 | Lertora et al. |
| 2007/0118320 | A1 | 5/2007 | Luo et al. |
| 2007/0244676 | A1 | 10/2007 | Shang et al. |
| 2007/0256044 | A1 | 11/2007 | Coryer et al. |
| 2007/0267680 | A1 | 11/2007 | Uchino et al. |
| 2008/0072182 | A1 | 3/2008 | He et al. |
| 2008/0120129 | A1 | 5/2008 | Seubert et al. |
| 2009/0070726 | A1 | 3/2009 | Mehrotra et al. |
| 2009/0268677 | A1 | 10/2009 | Chou et al. |
| 2009/0313592 | A1 | 12/2009 | Murali et al. |
| 2010/0040162 | A1 | 2/2010 | Suehiro |
| 2011/0022754 | A1 | 1/2011 | Cidon et al. |
| 2011/0035523 | A1 | 2/2011 | Feero et al. |
| 2011/0060831 | A1 | 3/2011 | Ishii et al. |
| 2011/0072407 | A1 | 3/2011 | Keinert et al. |
| 2011/0154282 | A1 | 6/2011 | Chang et al. |
| 2011/0276937 | A1 | 11/2011 | Waller |
| 2012/0022841 | A1 | 1/2012 | Appleyard |
| 2012/0023473 | A1 | 1/2012 | Brown et al. |
| 2012/0026917 | A1 | 2/2012 | Guo et al. |
| 2012/0054511 | A1* | 3/2012 | Brinks ............... G06F 1/26 713/310 |
| 2012/0099475 | A1 | 4/2012 | Tokuoka |
| 2012/0110541 | A1 | 5/2012 | Ge et al. |
| 2012/0155250 | A1 | 6/2012 | Carney et al. |
| 2013/0028090 | A1 | 1/2013 | Yamaguchi et al. |
| 2013/0051397 | A1 | 2/2013 | Guo et al. |
| 2013/0080073 | A1 | 3/2013 | de Corral |
| 2013/0103369 | A1 | 4/2013 | Huynh et al. |
| 2013/0151215 | A1 | 6/2013 | Mustapha |
| 2013/0159944 | A1 | 6/2013 | Uno et al. |
| 2013/0174113 | A1 | 7/2013 | Lecler et al. |
| 2013/0207801 | A1 | 8/2013 | Barnes |
| 2013/0219148 | A1 | 8/2013 | Chen et al. |
| 2013/0263068 | A1 | 10/2013 | Cho et al. |
| 2013/0326458 | A1 | 12/2013 | Kazda et al. |
| 2014/0068132 | A1 | 3/2014 | Philip et al. |
| 2014/0092740 | A1 | 4/2014 | Wang et al. |
| 2014/0098683 | A1 | 4/2014 | Kumar et al. |
| 2014/0115218 | A1 | 4/2014 | Philip et al. |
| 2014/0115298 | A1 | 4/2014 | Philip et al. |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.
Ebrahimi, E., et al., Fairness via Source Throttling: A Configurable and High-Performance Fairness Substrate for Multi-Core Memory Systems, ASPLOS '10, Mar. 13-17, 2010, 12 pgs.
Grot, B., Preemptive Virtual Clock: A Flexible, Efficient, and Cost-Effective QOS Scheme for Networks-on-Chip, Micro '09, Dec. 16, 2009, 12 pgs.
Grot, B., Kilo-NOC: A Heterogeneous Network-on-Chip Architecture for Scalability and Service Guarantees, ISCA 11, Jun. 4-8, 2011, 12 pgs.
Grot, B., Topology-Aware Quality-of-Service Support in Highly Integrated Chip Multiprocessors, 6th Annual Workshop on the Interaction between Operating Systems and Computer Architecture, Jun. 2006, 11 pgs.
Jiang, N., et al., Performance Implications of Age-Based Allocations in On-Chip Networks, CVA MEMO 129, May 24, 2011, 21 pgs.
Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li, B. et al., CoQoS: Coordinating QoS-Aware Shared Resources in NoC-based SoCs, J. Parallel Distrib. Comput., 71(5), May 2011, 14 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
Ababei, C., et al., Achieving Network on Chip Fault Tolerance by Adaptive Remapping, Parallel & Distributed Processing, 2009, IEEE International Symposium, 4 pgs.
Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.
Gindin, R., et al., NoC-Based FPGA: Architecture and Routing, Proceedings of the First International Symposium on Networks-on-Chip (NOCS'07), May 2007, pp. 253-262.
Yang, J., et al., Homogeneous NoC-based FPGA: The Foundation for Virtual FPGA, 10th IEEE International Conference on Computer and Information Technology (CIT 2010), Jun. 2010, pp. 62-67.
International Search Report and Written Opinion for PCT/US2014/023625, dated Jul. 10, 2014, 9 pgs.

* cited by examiner

AUTOMATIC GENERATION OF POWER MANAGEMENT SEQUENCE IN A SOC OR NOC

CROSS REFERENCE TO RELATED APPLICATION

The present application is a continuation of U.S. application Ser. No. 14/498,907 filed Sep. 26, 2014, and incorporates all the disclosures herein.

BACKGROUND

Technical Field

Methods and example implementations described herein are directed to a system-on-chip architecture, and more specifically, to generation of power management sequences for hardware elements of a System on Chip (SoC) and a Network on Chip (NoC).

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links. In an example implementation, such links can denote connectivity and direction of data flow within the SoC and the NoC.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components, which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 connected.

Packets are message transport units for intercommunication between various components. Routing involves identifying a path composed of a set of routers and physical links of the network over which packets are sent from a source to one or more destination component(s). Component(s) are connected to one or multiple ports of one or multiple routers; with each such port having a unique ID. Packets carry the destination's router and port ID for use by the intermediate routers to route the packet to the destination component(s).

Examples of routing techniques include deterministic routing, which involves choosing the same path from A to B for every packet. This form of routing is independent from the state of the network and does not load balance across path diversities, which might exist in the underlying network. However, such deterministic routing implemented in hardware, maintains packet ordering and may be rendered free of network level deadlocks. For example, shortest path routing may minimize the latency, as such routing reduces the number of hops from the source to the destination(s) or the cost of routing the packet from the source to the destination(s), wherein the cost of routing depends on the bandwidth available between one or more intermediately. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination(s). For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

NoC interconnects may employ wormhole routing, wherein, a large message or packet is broken into small pieces known as flits (also referred to as flow control digits). The first FLIT is the header flit, which holds information about this packet's route and key message level info along with payload data and sets up the routing behavior for all subsequent FLITs associated with the message. Optionally, one or more body FLITs follows the head FLIT, containing the remaining payload of data. The final FLIT is the tail FLIT, which in addition to containing the last payload also performs some bookkeeping to close the connection for the message. In wormhole flow control, virtual channels are often implemented.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination(s).

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each or a group of NoCs may be collectively formed as a layer, thus creating a multi-layer NoC architecture by means of organizing a plurality of NoCs across multiple layers. Hosts inject a message on a NoC layer, which is routed to the destination(s) on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers of different layers, wherein for instance a router connected to host in the first layer is shown as R1, and a router connected to same host in the second layer is shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present disclosure will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

As the numbers of on chip components are growing and different heterogeneous subsystems having different frequency and voltage requirements are placed on chip, efficient and low overhead power management has become more difficult. Each heterogeneous resource and subsystem typically has its own power management (PM) protocol, generally developed on an ad-hoc basis and lacking any standard signaling mechanisms. There have been several attempts in past to provide efficient and low overhead power management. Some of the known prior art systems for power management are typically hardware/software implemented with limited configurability. Power management of these individual components on chip, or subsystem on chip or system on chip, requires one or more components to change their power state and switch from one power profile to another power profile based on certain instructions.

A typical SoC or NoC can be designed and optimized for better power performance for a set of power profiles. Power profile of SoC is the state of SoC where different components of SoC are in different power state and are assigned different voltage and clock frequencies. In present days, SoCs can be configured to operate and support varying power profiles, and need to change from one power profile to another based on the function intended to be performed by the SoC. When the SoCs change from one power profile to another, a number of on-chip components/network elements/agents need to change their power state (for example, they may need to go ON/OFF) or change the voltage and power domains. Therefore, a sequence of events takes place while changing each power profile, wherein such sequence of events is commonly/typically referred to hereafter as power management sequence(s). Power management sequence(s) are of significance while defining switching efficiency/speed of network elements from one power profile to another power profile without affecting the circuit on chip. There are several parameters such as SoC design, circuit limitation, interdependency of these components, present power state of one and more components, among others parameters that needs to be taken into consideration before deciding power management sequence(s). None of the existing prior art literature provides or discloses generation of power management sequence(s) for efficient and safe working of SoC/NoC when it switches from one power profile to another power profile. Also, as SoC components change from one power profile to another, there may be some external events such as interrupts that needs to be taken into consideration while executing power profile change or while generating power management sequence(s). A device starting up when the external power has been removed completely (sometimes referred to as cold-boot) may need special handling in the power management sequencing.

Therefore, there is need for a method/system/apparatus/mechanism for automatic generation of power profile sequence(s) for SoC/NoC components for efficient and safe working of SoC/NoC components/elements.

SUMMARY

Aspects of the present disclosure are directed to a method, system/apparatus, and non-transitory computer readable medium for automatically generating one or more power management sequence(s) for SoCs from a given input specification for switching from one power profile to another. The input specification can include one or a combination of System on Chip (SoC) design specification, Network on Chip (NoC) design specification, power specification comprising power domain assignment information, voltage domain assignment information, clock frequency assignment information, power profile information, traffic profile information, information about interdependency of components, external parameters/factors, traffic flow information, among other parameters. The one or more input specifications can include other information such as current capacity of each channel connecting one or more components, power state retention requirement, power constraints, bandwidth limitations, and inter-component communication protocols. Based on the given input specification/information, method of the present disclosure can determine one or more elements/components that need to change their power states when the SoC switches from one power profile to another. Example implementations of present disclosure analyze the input specification and determine interdependency of components/agents/network elements on chip and generate power management sequence(s). Systems and methods of the present disclosure also determine one or more elements/components that can change their power state (for example go ON/OFF, or need to change power domain, value domain and clock frequency value) in parallel based on the given input specification when the SoC switch from one power profile to another.

In an example implementation, the system/method of the present disclosure can be configured to analyze input specifications and determine interdependency of components/agents/network elements on chip and generate power management sequence(s), for example, sequence(s) that provide instructions for switching power states of interdependent elements having producer-consumer relationship by first changing the power state of consumers/dependents, then changing power state of intervening NoC elements, and then finally switching the power state of the producers.

Aspects of the present disclosure may further include power management sequence(s) for switching power state of all of the one or more elements based on power rails that are indicative of power load available from voltage domain assignment information and power domain assignment information keeping in context the current overflow and safety of the SoC.

Aspects of the present disclosure further provide power management sequence(s) to the power controller of SoC that converts the power management sequence(s) into executable instructions. The executable instructions can be configured such that they are implemented in a hierarchical file structure manner or flat file structure manner as desired.

Aspects of the present disclosure further provide a method and non-transitory medium for dynamically/automatically generating power management sequence(s) while considering the given retention requirement for providing functionality for save function (for saving the power state) and restore function for one or more states associated with one or more elements/components/agents.

Aspects of the present disclosure provide power management sequence(s) in a format suitable for power management sequence simulation. Further aspects of the present disclosure provide the power management sequence(s) in a format suitable for consumption by any electronic design automation/simulation tool.

Aspects of the present disclosure also provide dynamic power management sequence(s) for dynamically/automatically assigning the power domain and voltage domain to the components of the SoC.

Aspects of the present disclosure describes a System on Chip (SoC) that includes at least one first component/element configured to consume data generated by a second component/element, and which can be configured to conduct error handling when the first component is rendered inactive in response to a signal. The signal can be a power management sequence instruction for changing the power state of one or more components during power profile change. In an example implementation, error handling can include one or more instructions to keep the first component/element active.

DETAILED DESCRIPTION

Figure 1A:
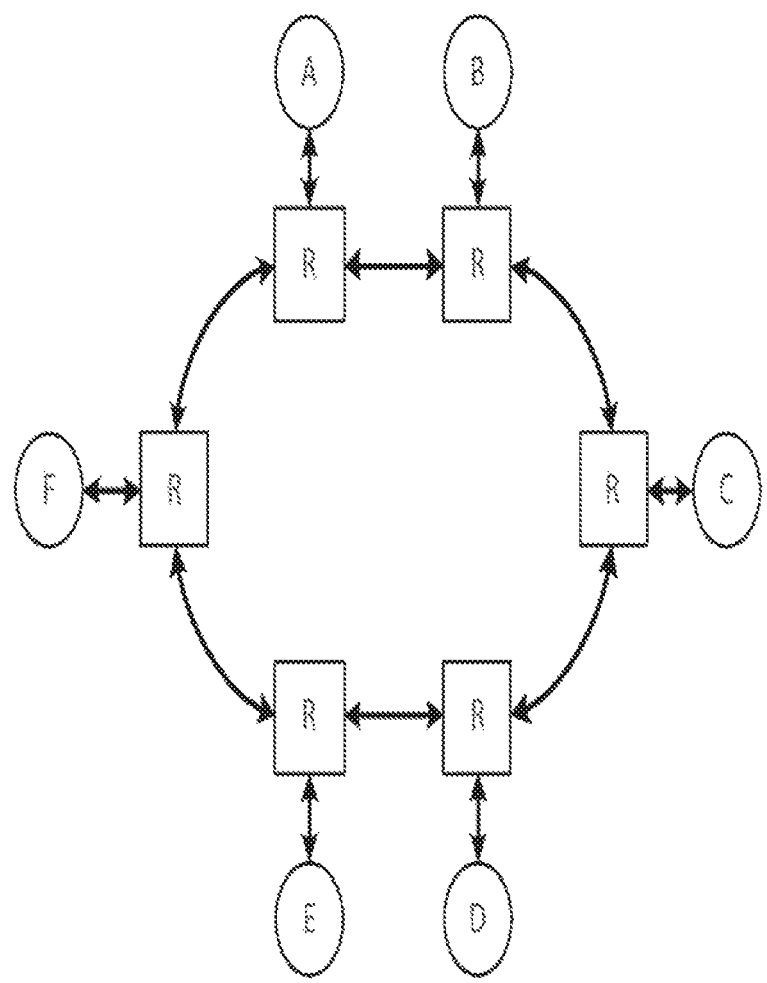
FIGS. 1(a), 1(b) 1(c) and 1(d) illustrate examples of Bidirectional ring, 2D Mesh, 2D Torus, and 3D Mesh NoC Topologies.
Figure 1B:
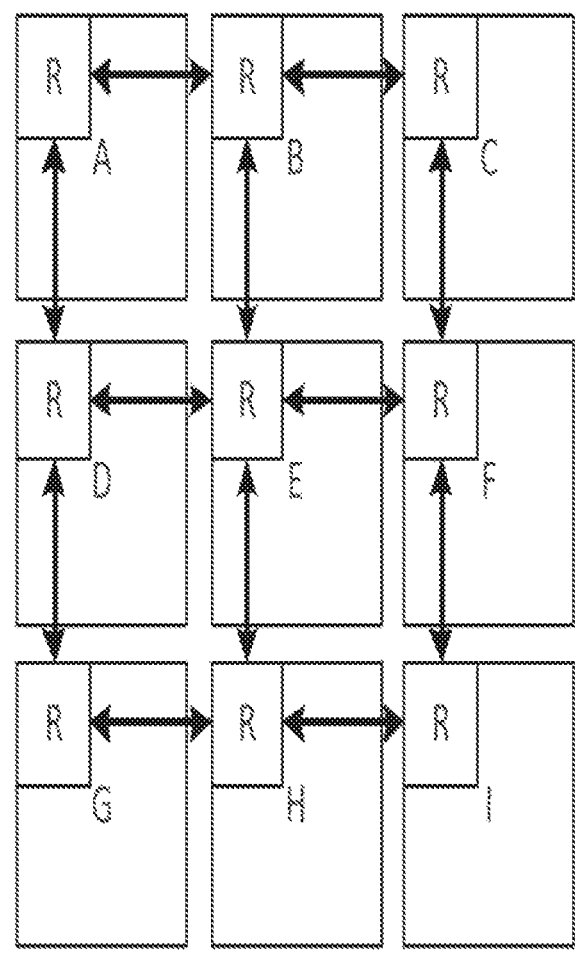
Figure 1C:
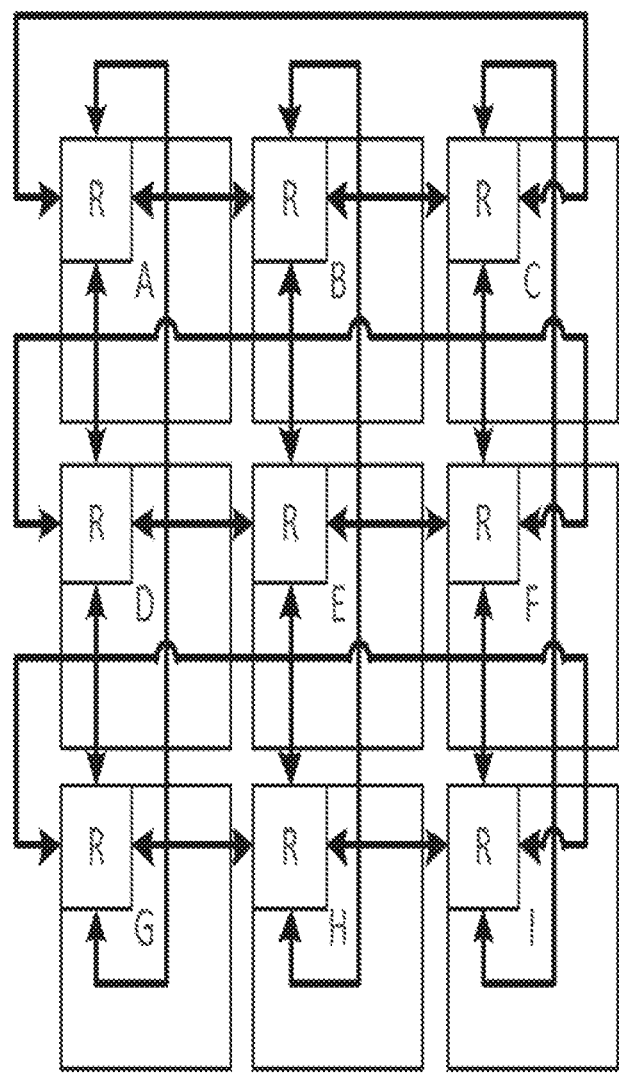
Figure 1D:
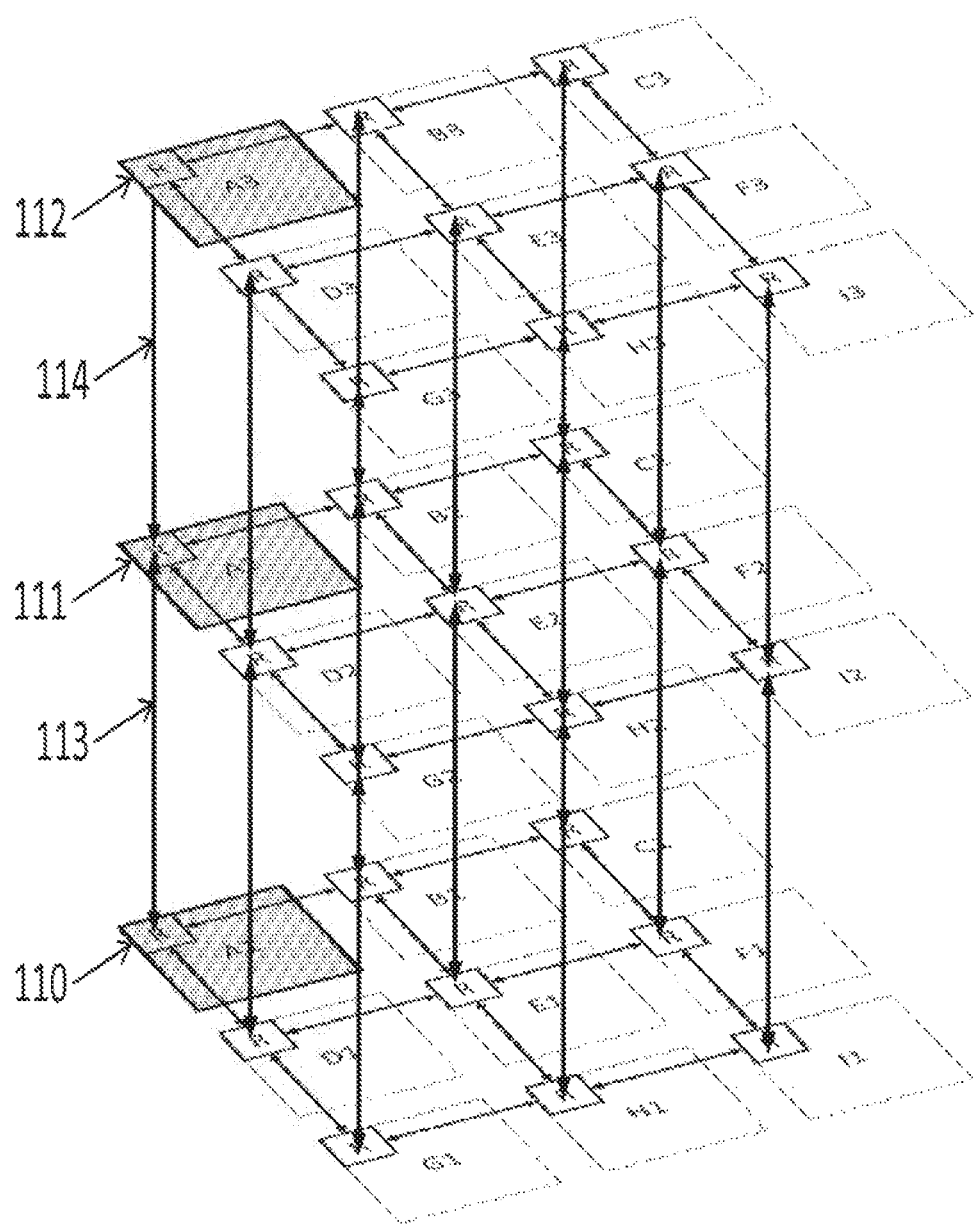
Figure 2A:
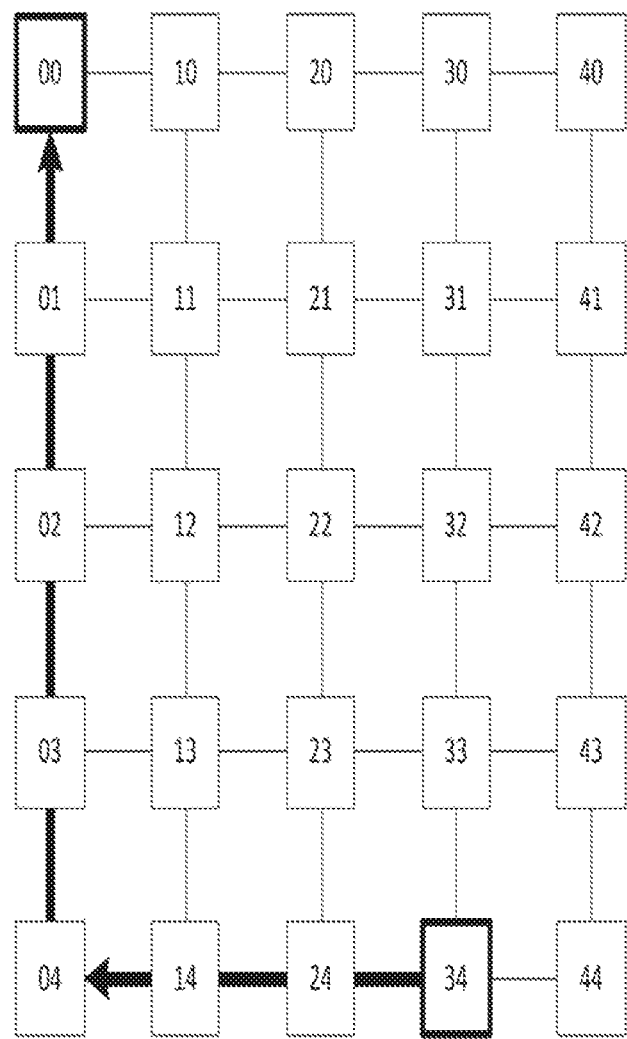
FIG. 2(a) illustrates an example of XY routing in a related art two dimensional mesh.
Figure 2B:
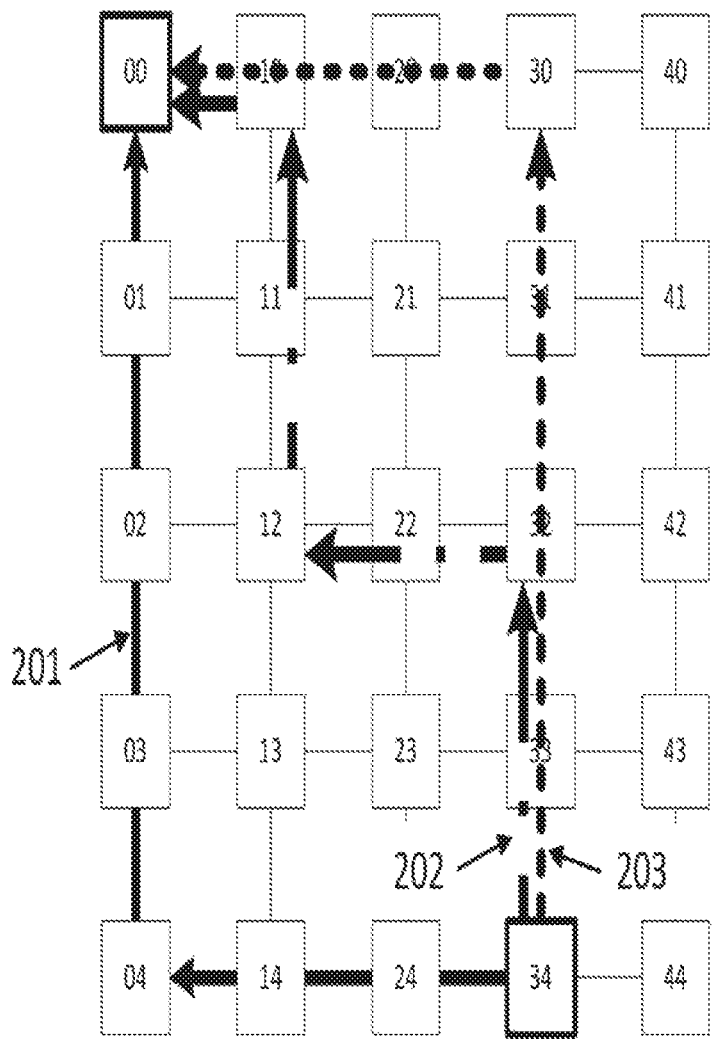
FIG. 2(b) illustrates three different routes between a source and destination nodes.
Figure 3A:
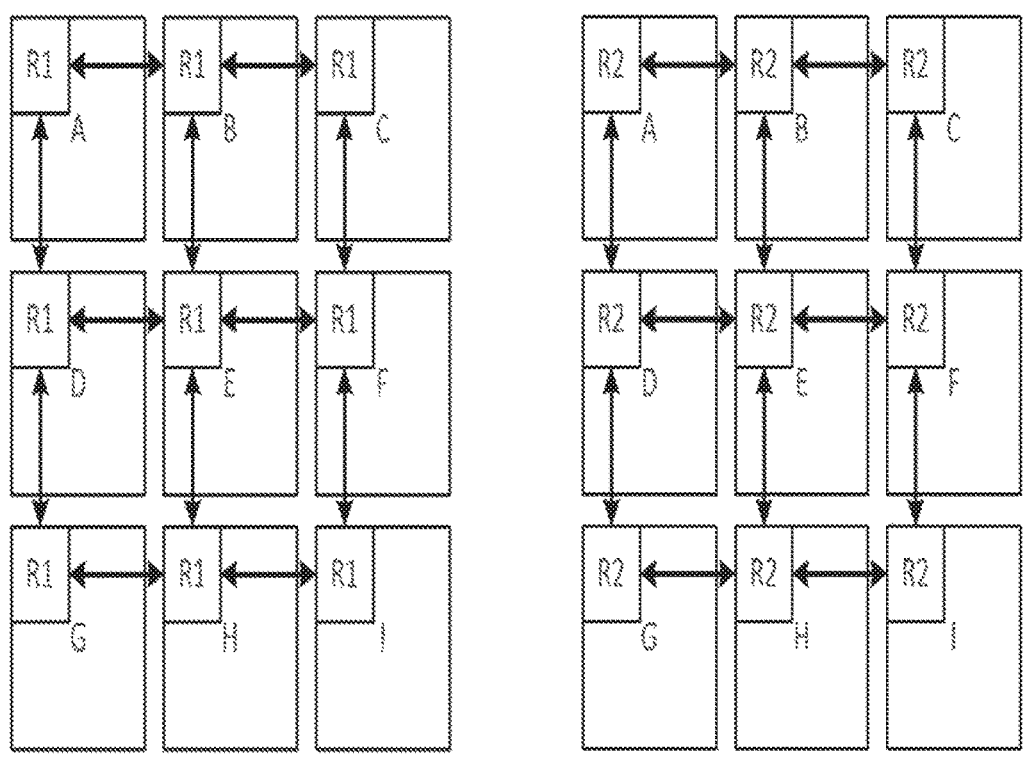
FIG. 3(a) illustrates an example of a related art two layer NoC interconnect.
Figure 3B:
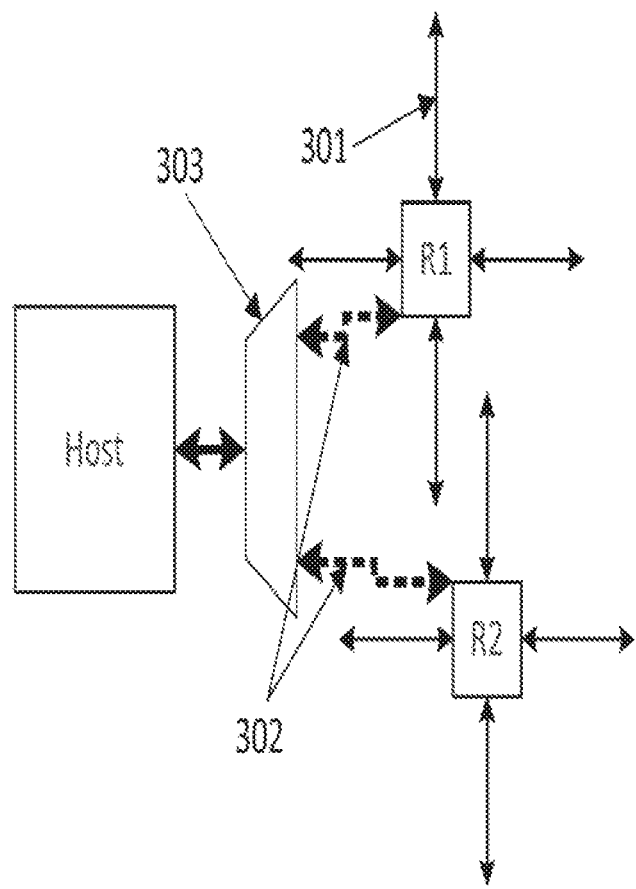
FIG. 3(b) illustrates the related art bridge logic between host and multiple NoC layers.

The following detailed description provides further details of the figures and example implementations of the present disclosure. Reference numerals and descriptions of redundant elements between figures are omitted for clarity. Terms used throughout the description are provided as examples and are not intended to be limiting. For example, use of the term "automatic" may involve fully automatic or semi-automatic implementations involving user or administrator control over certain aspects of the implementation, depending on the desired implementation of one of ordinary skill in the art practicing implementations of the present disclosure.

Aspects of the present disclosure are directed to a method, apparatus, system, and non-transitory computer readable medium for automatically generating one or more power management sequence(s) for SoCs and NoC components/elements based on a given input specification/design for NoC and SoC for switching from one power profile to another and further based on power profile information defined by a user. According to one example implementation, input specification can include, but is not limited to, System on Chip (SoC) design specification, Network on Chip (NoC) design specification, power specification comprising power domain assignment information, voltage domain assignment information, clock frequency assignment information and power profile information, traffic profile information, information about interdependency of components, and traffic flow information, among other parameters. According to another example implementation, input specification can also include, but is not limited to, information pertaining to, for instance, current capacity of each channel/link connecting one or more components, constraints defined for power rails such as how many hardware elements can be powered on together, power state retention requirement, retention information for hardware elements, whether flat or hierarchical architecture is required, initiator-consumer relationship, power constraints, external factors that can cause power sequence(s) to abort, bandwidth limitations, and inter-component communication protocols. Based on the given input, the method/apparatus of the present disclosure can determine one or more elements/components that need to change their power state when the SoC switches from one power profile to another. Example implementations of present disclosure analyze input specifications and determine interdependency of components/agents/network elements on chip and generate power management sequence(s). The method can also determine one or more elements/components that can change their power state in parallel based on given input specification(s) when the SoC switches from one power profile to another.

In an example implementation, method of the present disclosure analyzes input specifications and determines interdependency of components/agent/network elements on chip to generate power management sequence(s), for example, that provide instructions for switching power states of interdependent elements having producer/initiator-consumer relationship by first changing power state of elements identified as consumers/dependent, then changing power state of intervening elements, and then switching power state of elements identified as producers. One should appreciate that instead of changing state of each element, power state of a defined number of intervening/consumer/initiating elements can also be changed as desired and configured.

Aspects of the present disclosure may further include power management sequence(s) for switching power state of elements based on power rails that are indicative of power load available from voltage domain (VD) assignment information and power domain (PD) assignment information keeping in context current overflow and safety of the SoC.

Aspects of the present disclosure further provide power management sequence(s) to the power controller of SoC that converts power management sequence(s) into executable instructions. The executable instructions can be configured to be implemented in a hierarchical file structure manner or flat file structure manner.

Aspects of the present disclosure also provide a method and non-transitory medium for dynamically generating power management sequence(s) while considering the given retention requirement for providing functionality for save (for saving the power state) and restore function for one or more states associated with one or more elements/components/agents.

Aspects of the present disclosure provide power management sequence(s) in a format suitable for power management sequence simulation. Further aspects of the present disclosure provide power management sequence(s) in a format suitable for consumption by any electronic design automation tool and also for any retention information for the registers.

Aspects of the present disclosure also provide automatic power management sequence(s) for assigning PD and VD to components of the SoC. Aspects of the present disclosure further describe a System on Chip (SoC) that includes at least one first component/element configured to consume data generated by a second component/element, and which can be configured to conduct error handling when the first component is rendered inactive in response to a signal. The signal can be a power management sequence instruction while changing the power state of one or more components during power profile change. In an example implementation, the error handling includes one or more instructions to keep the first component/element active.

In example implementations, power profile can indicate which all components/elements/agents/hosts need to be in ON or OFF state. For example, an audio profile can require that the hosts of the display and CPU are powered OFF, while the hosts of the memory and speakers power are ON. When the profile changes from audio profile to video profile, a series of actions needs to be taken so as to shift the SoC to second power profile. According to an example implementation, the power profile information is indicative of present state of the hardware elements. For example, it can indicate the state of set of hardware elements that are ON, set of hardware elements that are OFF and voltage level of each hardware elements.

As described above, a typical SoC may have various components that are interconnected with each other using multiple routers, network elements, and point-to-point links/channels. Different components, network elements, and links/channels on chip may have different properties such as quality of service (QoS), bandwidth, latency requirement, transaction capacity, power profile, interdependency (e.g., producer-consumer relationship). The present disclosure considers these parameters among others to automatically and/or dynamically generate power management sequence(s) when a set of determined components needs to change its power state from one power state to another. For automatically generating power management sequence(s), proposed method of the present disclosure can take one or more parameters into consideration including but not limited to NoC design, NoC design limitation, protocol used by individual components, traffic profile information, present voltage assignment information, and current assignment information of all the component/network elements and current carrying capacity of each channel.

In an example implementation, traffic profile information can be used to analyze how various transactions can be routed in various NoC topologies. Traffic profile information can also provide information about link capacities, data flow direction, virtual channels, and capacity of router nodes of the NoC. Detail knowledge of the traffic profile can lead to a more optimized NoC hardware with minimal over provisioning in terms of link wires, virtual channel buffers, and additional router nodes and can also help determine optimal power management sequence(s). A variety of SoCs today are designed to run a number of different applications, and the resulting NoC traffic profile therefore may differ based on how and where the SoCs are deployed, and what applications are supported by these SoCs. Supporting a variety of traffic profiles offers several challenges in the NoC design, its optimization, and its power management. Although the SoCs can be initially designed and optimized to support fixed or varying traffic, the actual traffic profile observed at run time may be different from the set of profiles for which the SoC components were optimized, leading to sub-optimal power consumption and SoC performance. An example implementation of the present disclosure use real time traffic profile information to automatically generate optimal power management sequence(s) when a set of components/elements are determined to switch from one power state to another power state, so as to optimize the power consumption and SoC performance.

In an example implementation, hardware components and/or network elements (also referred interchangeably as elements) or agents on chip, can include routers, bridges and pipeline stages. In the present disclosure, components, host, agents, network elements are used interchangeably to collectively refer to any component on chip.

In example implementations, traffic profile specification can be used to automatically and/or dynamically generate power management sequences, where the traffic profile specification can include information about connectivity between agents/elements/components and link/channel bandwidth information. In an example implementation one or more input specification such as power specification and traffic specification can be individually or in combination used to dynamically generate power management sequence(s). The input traffic specification can include communication protocol used by the SoCs and NoCs. Example communication protocols may require acknowledgement every time a first component sends a message/data/instruction to second component on chip, whereas the other protocol may not require the acknowledgement. The protocol information can be used by the method of present disclosure in combination of other input specifications while automatically generating the power management sequence(s). Protocol information can help the method of present disclosure to choose optimal sequences such that the second component in the given example is not turned down unless it sends the acknowledgement if the protocol requires so.

In an example implementation, power profile of SoCs can include power domain (PD) information and voltage domain (VD) information of each individual component or a group of components on chip. Real-time VD assignment information can be used for better power management, where the voltage supplied to a collection of transistors of the hardware element can be different and independent of source voltage supplied. Similarly, PD information of each component can indicate an area to which the power can be interrupted by a power switch, wherein the power switches can be on-chip switches with 'always on' cells and state retention logic, or can also be off chip switches with no 'always on' cells.

Figure 4:
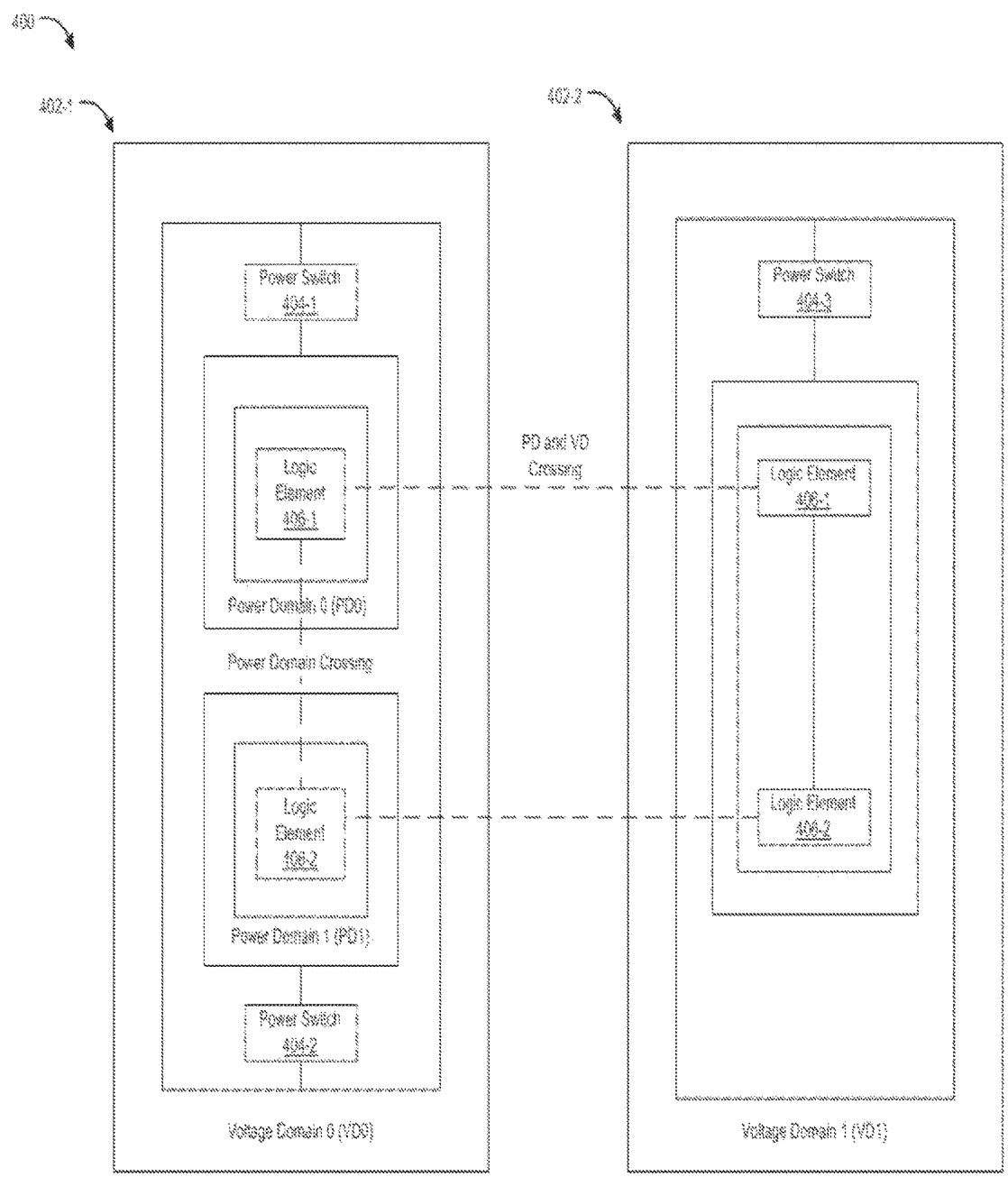
FIG. 4 illustrates an example representation 400 showing power domain, voltage domain, and power switches for one or more logic elements, in accordance with an example implementation.

FIG. 4 illustrates an example representation 400 showing power domain, voltage domain, and power switches for one or more logic elements, in accordance with an example implementation. FIG. 4 shows two sets of logic elements 402-1 and 402-2, wherein 402-1 includes two power switches 404-1 and 404-2, and two logic elements 406-1 and 406-2 having respective power domains (PD0 and PD1). According to one example implementation, 402-1 is shown to pertain to voltage domain VD0, and the representation shows power domain crossing from one power domain PD0 of logic element 406-1 to PD1 of 406-2. 402-2, on the others shows, modified version of 402 after power domain crossing having a single power switch 404-3 and the two logic elements 406-1 and 406-2 having a new voltage domain VD1. In an example implementation, a power specification may include available power profile of NoC and SoC in addition to the information regarding the available power domains and the available voltage domains. In an example implementation, where power state of certain components/agents needs to be retained, input specification may contain that information. In case there is a requirement to preserve state of certain registers/components/agents during a power cycle, special logic may be inserted to retain such state. The special logic can be powered by a source which will always keep it ON and when the power to the main registers is closed, the retention logic ensures that the values in the protected registers are not corrupted/lost. Power profile information can also indicate what all elements can be powered up and run simultaneously without causing wires within the NoC or SoC to fail, considering the maximum current limitation that can pass through the wires.

Any other input parameter/condition/criteria can also be incorporated for automatic generation of power management sequence(s) and all such parameters are completely within the scope of the present disclosure. Such parameters can include but are not limited to information on component constraints such as current capacity of the hardware elements, power rails (for example, how many component/agents can be powered up together), information about communication protocols used by the network elements (such as routers, bridges), the ordering requirement and acknowledgement requirement. In an instance, a constraint can be such that a group of elements must be powered up or down together. For instance, such a group of elements can have only one power switch and hence will be turned ON/OFF together. Therefore, isolation for all such elements that form part of the group must be asserted first before turning off the power domain.

In an example implementation, interdependency between relationship information such as producer consumer relationship, or between hardware elements can be used as an input specification in the present disclosure. Such information can include for example, which hardware elements produce certain data, and which hardware elements consume the generated data. Dependency information can be used to avoid unwanted change of power state of the dependent hardware elements. For example, if the state of producer element needs to the change, the method can check whether producer has already completed the assigned task of producing the data for consumer or not. If the producer has not produced the data that is needed by the consumer, the state of said producer should not be abruptly changed, as the consumer has dependency over the producer. In an example implementation, traffic specification and real time data flow between elements can be provided as an input for automatic generation of power management sequence(s).

In an example implementation, method of the present disclosure can also take into consideration external factors that can cause the power sequencing to abort and/or pause, for instance, interrupts.

In an example implementation, the present disclosure can further include a System on Chip (SoC) having a first hardware element that is configured to consume data from a second hardware element that is configured to provide such data. In an aspect, the first hardware element can be configured to be rendered inactive (by scaling of voltage and/or frequencies such that, for instance, when voltage is scaled all the way to '0', it becomes an OFF state, and when it is scaled all the way to max, it becomes ON state) in response to a signal, wherein when the second hardware element, in response to sending the data to the first hardware element, determines that the first hardware element is rendered inactive, the second element can be configured to conduct error handling. In an aspect, error handling can include the step of sending an instruction to the first hardware element to render the first hardware element as active.

Figure 5:
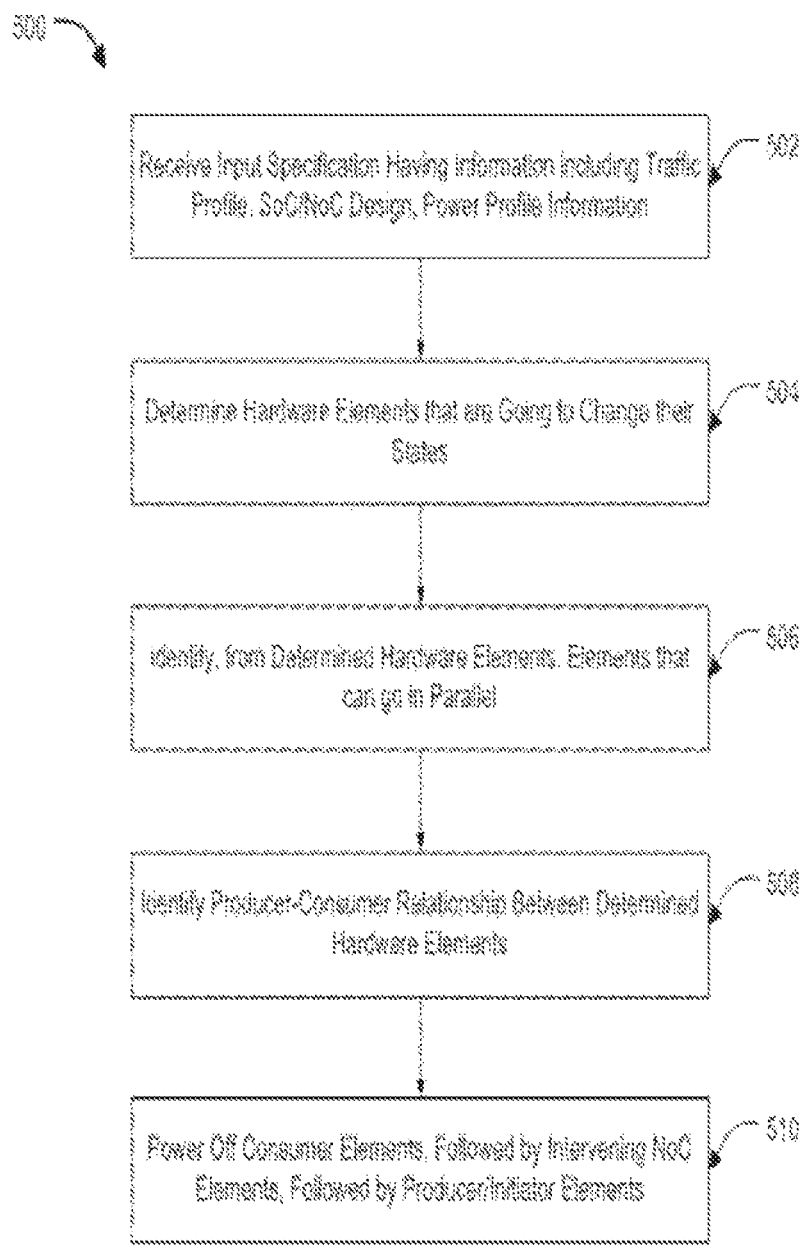
FIG. 5 illustrates an example flow diagram of a method for voltage domain and frequency scaling of components on chip in accordance with an example implementation of the present disclosure.

In an aspect of the present disclosure, information/data/configuration/settings provided as input specifications can be used by the proposed method/apparatus to provide several outputs for automatically and dynamically determining power management sequence(s) of the SoC and NoC components/elements. FIG. 5 illustrates an example flow diagram 500 of a method for automatic generation of power management sequence(s) in accordance with an example implementation of the present disclosure. Although the flow diagram 500 has been represented in a sequential stepwise manner, actual execution can be done in any order. As illustrated in step 502, the method receives input specification having, for instance, SoC/NoC design, traffic profile information, traffic flow information, power profile information, power domain information, voltage domain information, power retention requirement, power constraints, current constraints, external factors, retention information for hardware elements, flat vs. hierarchical requirement information, dependency information, among other such information either directly/automatically from an input means or from a user. Such specification information, as mentioned above, is completely exemplary and any further parameters/inputs can always be incorporated and are completely within the scope of the present disclosure.

At step 504, elements that are going to change their state from first power profile (PP1) to second power profile (PP2) can be determined. Dependencies between such and other elements of the SoC and NoC architecture can be evaluated. In an example implementation, dependency information can be provided as part of input specification or can be derived by analyzing the traffic profile and traffic flow information. In an example implementation, dependency can be identified from the traffic profile, where example implementations can determine what hardware elements are on and off for each power profile, along with determining voltage and clock frequency values assigned for each component, and identifying which hardware elements change power states when switching from power profile x (PPx) to another power profile y (PPy). Power management sequence(s) for switching the SoC and NoC from one power profile to another can include turning ON/OFF one or more components, assigning new VD/PD, and providing frequency scaling to one or more components.

At step 506, traffic specification/information received from input specification can be processed to identify elements that can run/go in parallel along with evaluation of elements whose power states can go in parallel. The step can further involve looking at intervening bridges to determine hardware elements that can operate in parallel and divide the elements into parallel sets determined from data flow analysis using any data flow analysis method.

At step 508, elements in a producer-consumer relationship can be identified. Producers can, in an example implementation, also be interchangeably referred to as initiators hereinafter and are configured to initiate a message/packet flow, where as consumers receive such messages/packets which they may or may not have requested for.

At step 510, the consumers can first be switched off, followed by powering off of intervening NoC elements such as routers, bridges, etc., and followed finally by powering off of the producers.

In an example implementation, apparatus/system and method of the present disclosure provides a sequence of steps to be taken by hardware elements to switch between different power profiles. In an instance, a set of controlling registers can be operatively coupled with one or more power switches and therefore can undergo power state transitions based on operation of the one or more power switches.

Figure 6:
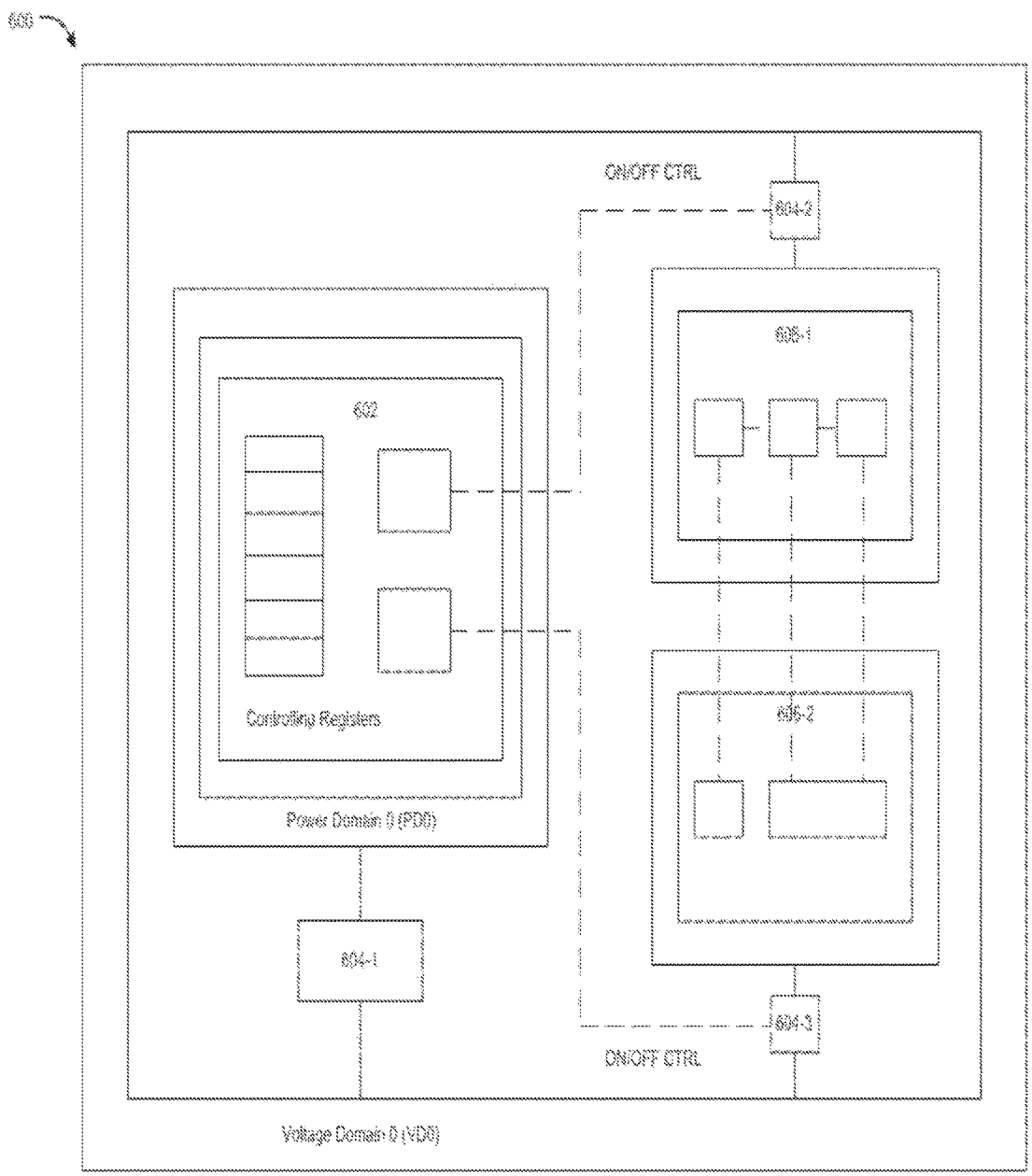
FIG. 6 illustrates an exemplary representation showing controlling registers connected to power switches.

FIG. 6 illustrates an exemplary representation 600 showing controlling registers connected to power switches. As shown, representation, in an example implementation, includes controlling registers 602 having a power domain PD0 connected with a voltage domain VD0 through a power switch 604-1. The registers 602 can be operatively coupled with other power switches 604-2 and 604-3, which are in turn configured to control other logic elements such as 606-1 and 606-2. For example, when hardware elements needs to change from power profile X to power profile Y, the shutdown and start up sequence(s) of the hardware elements can be provided by the method of present disclosure. In an example implementation, the sequence of steps can be implemented through a set of register read and write, or asserting/de-asserting power management signals of the hardware elements. The sequence of steps can indicate the exact order and parallelism in which each of the hardware elements can be powered up/down (e.g., which elements need to be powered up together). With the given input specification having traffic profile and traffic flow information, method of present disclosure can determine the set of power management sequences/steps that can be performed in parallel. Parallel execution of power management sequence(s) allows fast transition of power states of hardware elements on chip.

In an example implementation, method of the present disclosure provides retention and isolation instructions, which include information for automatically inserting retention and isolation logic in hardware for e.g., protecting the registers/components from power failure or unwanted change of power state. Method of the present disclosure also provides instruction for isolating connectivity between elements and notifying the initiator of a communication that the target element/agent has changed its power state. In an example implementation, in scenarios where one or more components/NoC elements are controlled by a single switch, before changing power state (to say powering off) of the common switch, isolation logic may be required to be implemented. In an instance, following sequence of instructions can be implemented before power gating takes place:
Write: Value=0x0cef, ADDR=0xFFFF1204←Isolate
Write: Value=0x1, ADDR=0xFFFF120C←Isolate
Poll: Value=0xcdef, ADDR=0xFFFF1000←Check if Ready to Power Gate
Write: Value=0x1, ADDR=0xFFFF1FF0←Power Gate In example implementations, save-restore sequence(s) can be generated based on the given input retention information. The method therefore enables generation of power management sequence(s) such that the register states can be preserved. The states can be saved/restored and preserved based on addition of retention logic, which can be in the form of an additional hardware element. The retention and isolation instructions can thereby provide an indication as to which hardware elements should be associated with the additional retention logic. This can also include instructions to save and restore the registers when powering up the NoC/SoC, so that the registers are saved and restored based on the defined retention information.

In example implementation, the instruction can be consumed by a processor executing the general set of steps or can be implemented as hardware in either a flat or a hierarchical file structure manner such that the sequence for the NoC is built using the power management sequence(s) of the individual elements. In a hierarchical file structure implementation, instructions can be used in a top down manner to execute generated power management sequence(s). For example, all the routers can be configured to change their power state first before changing the power states of lower hierarchical elements. In another example of a flat structure implementation, power sequence(s) can be expanded into smaller steps for processor without branch instructions. The hierarchical or flat determination for the power sequence(s) can be based on the input specification, wherein the input specification specifies the desired structure.

An example implementation of the present disclosure provides on-demand powering that allows configuration of hardware elements to power up/down on-demand. According to an example implementation, hardware elements can be configured with an ability to react to external input such as an interrupt, and abort execution of power sequence(s), along with an ability to pause power sequencing and then continue. The method provides power management sequence(s) that can indicate, for example to the producer that the consumer is not available such that when an external initiator tells the producer to make a request to the consumer, the producer can either potentially make the consumer available (power on etc.) or decide to send a message to the initiator to indicate that the consumer is unavailable. The initiator in this case can take an appropriate action.

In an example implementation, the generated power management sequence(s) based on on-demand powering information can generate an indication of steps in the power management sequence(s) that can be utilized to react to external input such as interrupt and external conditions, and can also insert a pause step (pause for x cycles and resume based on external interrupt). In an example implementation, the method can keep checking for external input such as interrupts and other external conditions at regular interval and can dynamically/automatically generate the power management sequence(s). Based on the given external conditions, the method can pause or stop the present execution of power management sequence(s). In an example implementation, the step indicated by on-demand powering instruction for checking the external condition can be implemented during or after each step in the power up/down sequence, or anywhere in the power sequence depending on the desired implementation and requirements of the SoC/NoC. For example, the steps can be chosen based on the length of time (cycles) of each step, (e.g., within 50 cycle step, every ten cycles, plug in every 5, 10, 15 cycles, etc.).

In an example implementation, the generated power management sequence(s) can be used for simulation and verification of SoC and NoC traffic and execution of power management sequence(s). The generated power management sequence instructions can be saved in a suitable file format that can be utilized for simulation and verification of SoC power management sequence(s). Generated power management sequence information can be saved in different file formats so as to be usable by other tools/software. Such files can be consumed by a processor configured as a controller of the NoC or SoC. In an example implementation, the power management sequence instruction for simulation and verification can be saved as a C or assembly program that can function as the power management controller. In an example implementation, specific hardware can be created to run the power management sequence instruction for simulation and verification. For simulation and verification, the produced power management sequence instructions can be incorporated into a SoC or NoC specification, and can be freely converted from one format to another such as system verilog.

In an example implementation, method of present disclosure can be configured to provide instructions for selectively isolating connectivity between on-chip agents/components/elements. Such instructions can be used by a processor that manages the power sequence(s) of the NoC or SoC to isolate connectivity between the on-chip agents/components/elements. The instructions for isolating the on-chip agents/components/elements can be based on the input specifications, and further based on the determined interdependency (such as a master-slave relationship or producer consumer relationship) between the components. Based on the generated instruction, the processor can mark a master/producer hardware element as disabled, power down the slave hardware elements, disable the host, and generate error messages if message is not sent to host.

In an example implementation, method of the present disclosure can further provide power management sequence(s) based on the power rail that is indicative of power load. When a set of components transition from one power profile to another, there exist possibilities to change its states, such as first power OFF all the components and then power ON the selected component, or first power ON all the component and then power OFF the selected component, among other like methods. Method/system of the present disclosure can be configured to generate such instructions to provide optimal power management sequence(s) while keeping the power load/current overflow and safety of chip in context.

In an example implementation, power management sequence(s) can be generated for registers or transistors of individual components or for the entire SoC and NoC. In example implementations, the method described above can be iterated for generating power sequence(s) of the entire NoC and also of the SoC that implements the NoC. One or more rule sets can be used to facilitate iteration of the power sequence(s). According to an example rule, when a set of components needs to change from power profile X to power profile Y, all the components on chip can be switched to power profile Y and then the components that were not required to change their states can be powered off or can be switched back to power profile X. Such a process can be continued iteratively whenever power sequence(s) need to change. Any other sequence of transitioning between power states is completely within the scope of the present disclosure.

In an example implementation, method/system of the present disclosure generates a sequence of events to dynamically assign voltage domain, power domain, and required power profiles to hosts, and to each of the individual hardware element in accordance with a set performance metric. The performance metric may include metrics such as reduced static power consumption (e.g., maximum reduction), reduced hardware cost (e.g., reduced area usage or uses of isolation cells, reduced power domain crossings, reduced level shifters, reduced voltage domain crossings). The performance metric can be implemented in the form of a cost function to balance the cost between the various metrics by a weighting system.

In an example implementation, automatically assigning power domains and voltage domains to each of the hardware elements can also be dependent on constraints in accordance with a desired implementation. For example, constraints can include restricting the number of different power domains and voltage domains within the SoC. Power domain properties can also be implemented with rules, such as always ON for some network elements (e.g., routers and bridges configured to never power down within selected power domains). Other constraints can include that the hardware element is restricted to using the power domain and/or the voltage domain of the neighboring hardware element. Such an assignment can be implemented dynamically, wherein a given hardware element can automatically be set based on neighbors of neighboring hardware elements. Through such iterations, the choices for power domains and voltage domains can change.

In an example implementation, the power domain and voltage domain dynamic assignment information can be derived based on example implementations of U.S. patent application Ser. No. 14/495,689, now herein incorporated by reference in its entirety for all purposes.

Figure 7:
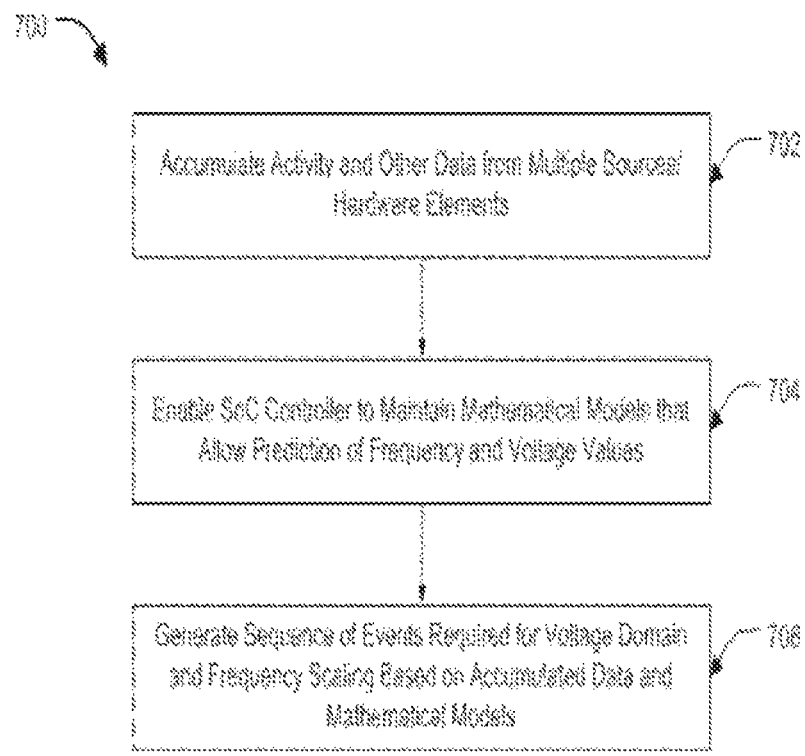
FIG. 7 illustrates an example flow diagram of a method for voltage domain and frequency scaling of components on chip in accordance with an example implementation of the present disclosure.

FIG. 7 illustrates an example flow diagram 700 of a method for voltage domain and frequency scaling of components on chip in accordance with an example implementation of the present disclosure. In an example implementation, voltage and frequency scaling can be either hardware controlled and/or software controlled. As shown in the FIG. 7, at step 702, the method accumulates data from multiple sources including activity data of multiple counters in hardware. Such information can further be accumulated from traffic and NoC/SoC design specification or from other sources mentioned above so to enable efficient decision making on whether certain logic can be slowed down or needs to speed up.

At next step 704, the SoC controller maintains mathematical models that allow it to predict the value of frequency and voltage, which are needed in order to achieve the desired performance. At next step 706, based on data received from multiple sources and defined mathematical models, a sequence of events required for voltage domain and frequency scaling can be generated to enable making of power sequencing decision and programming appropriate values in the logic elements in order to transition them to new voltage and/or frequency.

Figure 8:
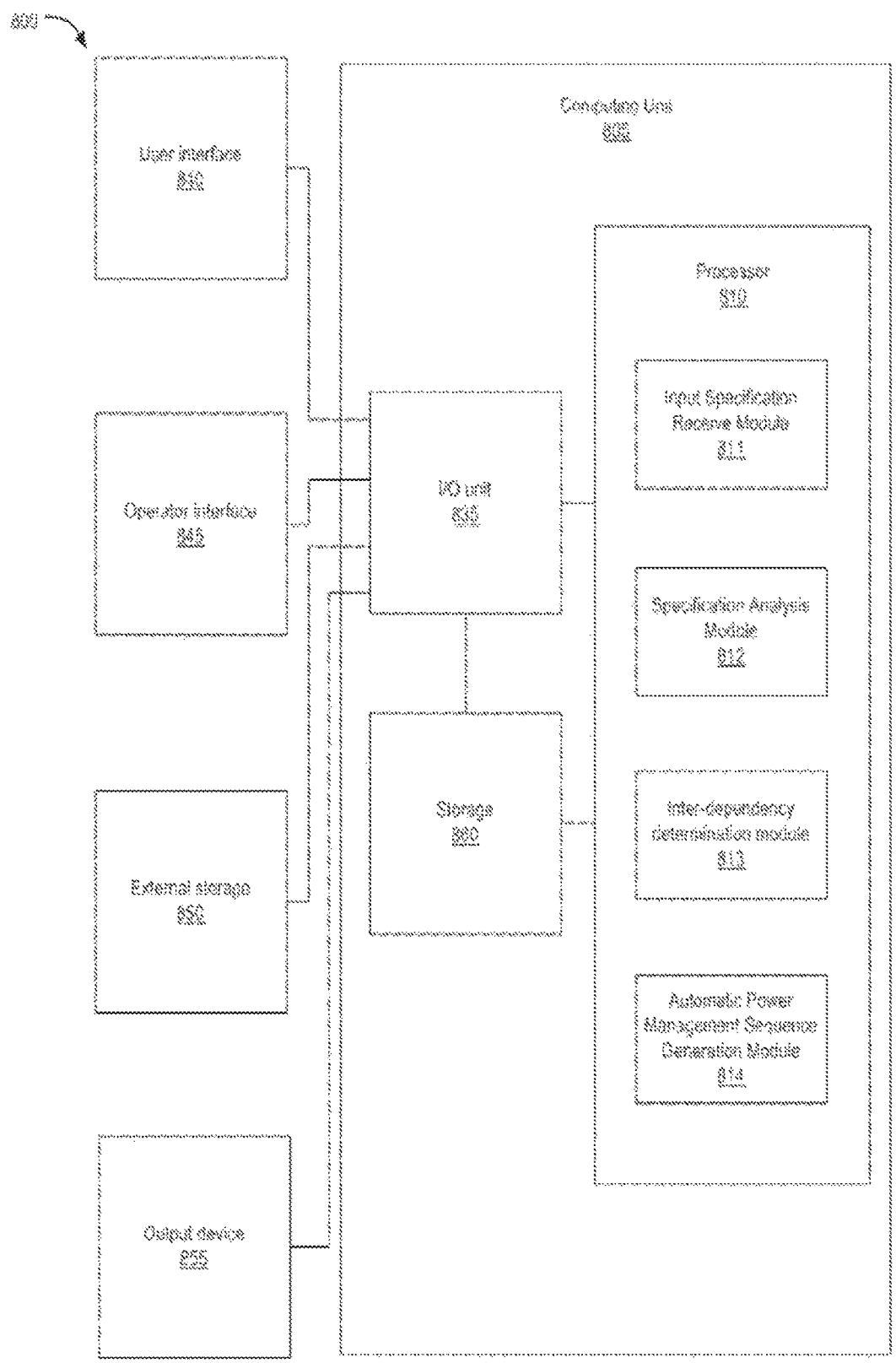
FIG. 8 illustrates an example computer system on which example implementations may be implemented.

FIG. 8 illustrates an example computer system 800 on which example implementations may be implemented. The computer system 800 includes a server 805, which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 805 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules including an input specification receive module 811, a specification analysis module 812, an inter-dependency determination module 813, and an automatic power management sequence generation module 814. According to one example implementation, input specification receive module 811 can be configured to receive one or more input specification including SoC/NoC design, power profile specification containing voltage domain information, power domain information and power profile information, traffic flow information, retention logic requirement, external parameters/factors, one or more constraints of SoC and its components, among other information/configuration/settings that can be used for dynamically generating power sequence(s).

According to one example implementation, the specification analysis module 812 can be configured to analyze input specification and derive various parameters/configurations such as present power status of the components, a list of components that need to change their power state, and a list of components that can change their power state in parallel. According to one example implementation, inter-dependency determination module 813 can be configured to determine the power/communication dependency between various hardware components/elements.

According to another example implementation, the automatic power management sequence generation module 814 can be configured to dynamically generate power management sequence(s) for SoC to switch from one power profile to another. The dynamic/automatic power management sequence generation module 814 can be configured to generate a sequence of events for changing power profile of entire SoC/NoC or the power profile of individual components or a set of components. The automatic power management sequence generation module 814 can further be configured to generate sequence of events that can be executed by the controller of SoC/NoC. The generated sequence of events can also be used for simulation and verification of power profile change and can be stored in a suitable file format that can further be used by other tools or software.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In an example implementation, the steps carried out require physical manipulations of tangible quantities for achieving a tangible result.

Moreover, other implementations of the present disclosure will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A computer system configured to configure a power management controller, the system comprising:
   a processor configured to:
   process an input specification to automatically generate one or more power management sequences, the input specification comprising at least one of a System on Chip (SoC) design and a Network on Chip (NoC) design, information of the at least one of the SoC design and the NoC design comprising power domain assignment information, voltage domain assignment, voltage level information, power profile information, and traffic profile information; and
   configure the power management controller with the one or more power management sequences that interfaces with at least one of a SoC and a NoC generated according to the at least one of the SoC design and the NoC design of the input specification.

2. The computer system of claim 1, wherein the processor is configured to automatically generate the one or more power management sequences by:
   based on the traffic profile information and the power profile information, determining one or more elements of the at least one of the SoC design and the NoC design configured to change between a first power state and a second power state;
   for each of the one or more elements, determining ones of the one or more elements that can switch from one power state to another in parallel based on a data flow analysis on the traffic profile information and the SoC design and the NoC design and the power profile information;
   generating a power sequence for the ones of the one or more elements based on a producer and consumer relationship, the power sequence comprising switching a power state of the ones of the one or more elements identified as consumers, powering down intervening ones of the one or more elements, and then switching the power state of the ones of the one or more elements identified as producers.

3. The computer system of claim 2, wherein the switching the power state of all of the one or more elements is based on power rails indicative of power load from the voltage domain assignment information.

4. The computer system of claim 1, wherein the processor is configured to automatically generate the one or more power management sequences by:
   based on the power profile information, determining one or more inactive ones of the one or more elements for each power profile state;
   generate a sequence comprising switching all of the one or more elements of the SoC and the NoC.

5. The computer system of claim 1, wherein the processor is configured to configure the power management controller by converting the one or more power management sequences into executable instructions.

6. The computer system of claim 5, wherein the executable instructions are configured to be one of a hierarchical file structure and flat file structure.

7. The computer system of claim 1, wherein the processor is further configured to provide functionality for a save function and restore function for one or more states associated with the at least one of the SoC design and the NoC design, wherein the save function and restore function are based on retention information.

8. The computer system of claim 1, wherein the processor is further configured to convert the one or more power sequences into a format suitable for simulation.

9. The computer system of claim 1, wherein the processor is further configured to convert the one or more power sequences into a format suitable for consumption by an electronic design automation tool.

* * * * *